United States Patent Office 3,475,458
Patented Oct. 28, 1969

3,475,458
PRODUCTION OF EPOXY AMMONIUM SALTS
James D. McClure, Oakland, and Paul H. Williams, Orinda, Calif., assignors to Shell Oil Company, New York, N.Y., a corporation of Delaware
No Drawing. Continuation-in-part of application Ser. No. 411,125, Nov. 13, 1964. This application Aug. 11, 1967, Ser. No. 659,866
Int. Cl. C07d 1/02
U.S. Cl. 260—348                                  3 Claims

ABSTRACT OF THE DISCLOSURE

Crystalline glycidyltrimethylammonium chloride, useful in the production of starch ethers, is produced by reaction of epichlorohydrin and trimethylamine in a solvent selected from saturated hydrocarbon ether, lower alkyl ketone, lower alkyl alkanoate and chloroform-hydrocarbon mixtures.

---

This application is a continuation-in-part of application Ser. No. 411,125, filed Nov. 13, 1964, and now abandoned, which is a continuation-in-part of Ser. No. 152,656, filed Nov. 15, 1961, now abandoned.

BACKGROUND OF THE INVENTION

The reaction of tertiary amines with epichlorohydrin is described in U.S. Patent 2,876,217 issued Mar. 3, 1959, to Paschall. The reaction of epichlorohydrin and trimethylamine in aqueous solution is depicted as producing a product for which the formula of glycidyltrimethlylammonium chloride is given, although the product is not referred to by such nomenclature, being described solely as an epichlorohydrin reaction product. The product is characterized as a thick syrup and is reasonably considered to be highly impure with a relatively low expoxide content. Burness, J. Org. Chem., 29, 1862 (1964), was unable to prepare glycidyltrimethyl-ammonium chloride by reaction of trimethylamine and epichlorohydrin.

SUMMARY OF THE INVENTION

It has now been found that an improved process of producing glycidyltrimethylammonium chloride comprises the reaction of epichlorohydrin and trimethylamine in certain reaction diluents. In contrast with the processes of the prior art which employ aqueous systems and with related processes employing non-appropriate organic solvents, the process of the invention results in the efficient production of crystalline glycidyltrimethylammonium chloride of high epoxide value.

DESCRIPTION OF PREFERRED EMBODIMENTS

The process of the invention comprises the reaction of epichlorohydrin and trimethylamine in liquid-phase solution in certain inert organic reaction diluents. The choice of a suitable diluent is a critical factor, as diluents that are overly basic or overly acidic are unsuitable because of the tendency of such materials to react with the oxirane linkage of the epihalohydrin reactant and/or the epoxy ammonium salt. However, some reaction diluents that are normally thought of as being inert in character with regard to oxirane ring opening are also unsuitable in the present process. For example, alcohols including tertiary alcohols such as tertiary butyl alchol, N,N-dialkylcarboxamides such as dimethylformamide and alkyl nitriles such as acetonitrile have been found to be unsuitable as reaction diluents when glycidyltrialkyl-ammonium halide products of high epoxide purity are desired.

Reaction diluents found to be suitable are exemplified by the ethers including saturated hydrocarbon ethers of from 2 to 10 carbon atoms such as the dialkyl ethers, e.g., diethyl ether, dipropyl ether, methyl hexyl ether and dibutyl ether, lower alkyl ethers (full) of polyhydric alcohols and polyoxyalkylene glycols, e.g., dimethoxyethane, 1,3 - diethoxypropane, glycerol triethyl ether, 1,2,6 - hexanetriol trimethyl ether, diethylene glycol dimethyl ether, diethylene glycol dipropyl ether and tetraethylene glycol dimethyl ether, as well as cyclic ethers such as tetrahydrofuran, dioxane and dioxolane; lower alkanones of from 3 to 6 carbon atoms including acetone, methyl ethyl ketone and methyl isobutyl ketone; and lower alkyl esters of lower alkanoic acids wherein the lower alkyl alkanoate contains from 3 to 8 carbon atoms such as methyl acetate, ethyl acetate, butyl acetate and propyl propionate. A preferred reaction diluent in the process of the invention is a mixture of chloroform and aliphatic hydrocarbon. Although neither the chloroform alone nor the hydrocarbon alone provides the desired diluent properties, a mixture thereof containing from about 10% to about 80% by weight of the hydrocarbon, preferably from about 30% to about 70% by weight of the hydrocarbon, is suitably utilized as a reaction diluent in the process of the invention. Aliphatic hydrocarbons that are suitably employed in mixtures with chloroform are acyclic, saturated, aliphatic hydrocarbons of from 5 to 10 carbon atoms such as pentane, isopentane, hexane, heptane, octane, isooctane, 2 - methylpentane, decane and the like.

The molar ratio of reactants is not critical although it is often advantageous to employ an excess of the epichlorohydrin. Molar ratios of epichlorohydrin to trimethylamine from about 8:1 to about 1:3 are satisfactory although molar ratios from about 6:1 to about 1:1 are preferred. The optimum amount of reaction diluent relative to the reactants will in part depend upon the particular reaction diluent employed. Molar ratios of diluent to the limiting reactant, e.g., the moles of epihalohydrin or moles of amine, whichever is smaller, of from about 2:1 to about 50:1 are generally suitable, with molar ratios of diluent to limiting reactant from about 3:1 to about 20:1 being preferred.

The process of the invention is conducted by mixing the reactants and reaction diluent and maintaining the reaction mixture at reaction temperature until reaction is complete. The method of mixing is not critical. One reactant may be added to the other in increment, although it is also useful to initially mix the entire amount of reactants. The process is conducted under conditions of temperature and pressure at which the reactants are maintained substantially in liquid-phase solution in the reaction solvent. Reaction temperatures from about 0° C. to about 80° C. are satisfactory although temperatures from about 10° C. to about 50° C. are preferred. The reaction is conducted at atmospheric, subatmospheric or superatmospheric pressure so long as the reaction mixture is maintained in the liquid phase. Little advantage is gained by the use of pressures other than atmospheric, and in the preferred modification of the process of the invention, a reaction pressure that is substantially atmospheric, e.g., from about 0.5 atmosphere to about 2 atmospheres, is employed. The reaction is preferably conducted under substantially anhydrous conditions. Although the presence of small amounts of water, e.g., up to about 1–2% of the reaction mixture may be tolerated without losing the advantages of the process of the invention, the yield and purity of the epoxy ammonium halide product will be adversely affected and the presence of mosture is preferably avoided. Subsequent to the reaction, the glycidyltrimethylammonium chloride is separated and recovered by conventional means. The glycidyltrimethylammonium chloride product is substantially insoluble in the remaining liquid components of the product mixture and is separated by processes of filtration, centrifugation, selective extraction or the like.

The product of the invention is glycidyltrimethylammonium chloride obtained in a crystalline form of high epoxide purity. The epoxide value is at least 0.57 equivalent per 100 grams and typically at least 0.60 equivalent per 100 grams. Because the quaternary ammonium salt is obtained as a crystalline material of high epoxide purity, it is particularly useful for applications where a cationic material of high purity is desired. A specific application for the glycidyltrimethylammonium chloride is in the production of starch ethers which have valuable properties as sizing agents, emulsifying agents, flocculating agents and the lie. When the glycidyltrimethylammonium chloride is reacted with starches according to the procedure of U.S. Patent No. 2,876,217, a gelatinized starch product is formed which may be dried to form a water-soluble cationic starch.

To further illustrate the improved process and the crystalline product of the invention, the following examples are provided. It should be understood that the details thereof are not to be regarded as limitations, as they may be varied as will be understood by one skilled in this art.

Example I

A solution of 178 g. (3 moles) of trimethylamine and 235 g. (2.5 moles) of epichlorohydrin in 1250 ml. of anhydrous dimethoxyethane was stirred at 30° C. The white crystalline precipitate which formed was washed with dimethoxyethane and then with ether and was dried in vacuo at 35° C. The yield of glycidyltrimethylammonium chloride, M.P. 137–139° C., was 196 g. which represented a 95% yield based upon a 55% conversion of epichlorohydrin. The crystalline product had an epoxide value of 0.63 eq./100 g. which was 96% of theory.

Example II

A solution of 8 g. of trimethylamine and 12 g. of epichlorohydrin in 50 ml. of ethyl acetate was stirred at 25° C. for 18 hours. The crystalline product, 6 g., was collected and washed several times with ether. The white crystals had an epoxide value of 0.63 eq./100 g. which was 96% of theory.

Example III

A solution of 0.25 mole of epichlorohydrin and 0.25 mole of trimethylamine in 125 ml. of diethyl ether was stirred at 25° C. for 64 hours. The crystalline product, 10.5 g., was collected and washed several times with fresh ether. The white crystals had an epoxide value of 0.57 eq./100 g. (86% of theory).

Example IV

A solution of 0.25 mole of epichlorohydrin and 0.3 mole of trimethylamine in 125 ml. of dry acetone was stirred at 25° C. for 28 hours. The resulting crystals were collected and washed with ether to yield 15 g. of glycidyltrimethylammonium chloride product which had an epoxide value of 0.63 eq./100 g. (96% of theory).

Example V

A series of experiments were conducted by a procedure similar to that of Example I employing mixtures of chloroform and hydrocarbon as the solvent. The results of this series are shown in Table I. The reaction temperature was 25±2° C.

TABLE I

| | Hydrocarbon | Moles of Epichlorohydrin Mole Trimethylamine | Epoxide Purity of Product, Percent |
|---|---|---|---|
| Chloroform in Solvent, Percent: | | | |
| 100 | None | 4.8 | 68 |
| 65.7 | Isopentane | 4.8 | 96 |
| 29.9 | do | 5.0 | 96 |

Similar results are obtained when hexane is employed as the hydrocarbon.

Example VI

For purposes of comparison, a series of experiments was conducted by a procedure similar to that of Example I but employing other solvents. The results of this series are shown in Table II.

TABLE II

| Solvent | Conversion of Epichlorohydrin, Percent | Epoxide Value of Product, eq./100 g. (Percent of theory) |
|---|---|---|
| t-Butyl alcohol | | 0.053 (8%) |
| Dimethylformamide | 70–75 | 0.04 (6%) |
| Acetonitrile | 90–95 | 0.03 (5%) |

We claim as our invention:

1. The process of producing crystalline glycidyltrimethylammonium chloride by reacting trimethylamine and epichlorohydrin, the molar ratio of epichlorohydrin to trimethylamine being from about 8:1 to about 1:3, in liquid-phase solution in from about 2 moles to about 50 moles per mole of limiting reactant of reaction diluent selected from chloroform-hydrocarbon mixtures of from about 30% by weight to about 70% by weight acyclic aliphatic saturated hydrocarbon of from 5 to 10 carbon atoms, at a temperature from about 10° C. to about 50° C., and separating glycidyltrimethylammonium chloride of an epoxide value of at least 0.57 equivalent per 100 grams from the resulting product mixture, said glycidyltrimethylammonium chloride being substantially insoluble in the remainder of said product mixture.

2. The process of claim 1 wherein the hydrocarbon is isopentane.

3. The process of claim 1 wherein the hydrocarbon is hexane.

References Cited

UNITED STATES PATENTS

| 2,876,217 | 3/1959 | Paschall | 260—348 X |
| 3,271,443 | 9/1966 | Burness | 260—348 X |
| 3,287,375 | 11/1966 | McGregor | 260—348 |
| 3,336,196 | 8/1967 | McGregor | 260—348 X |
| 3,342,840 | 9/1967 | Sobolev | 260—348 X |

OTHER REFERENCES

Houben-Weyl: Methoden der Organischen Chemie (1958), vol. 11/2, pp. 595–601 and 611.

Burness, D. M.: Jour. Org. Chemistry, vol. 29 (1964), pp. 1862–4.

Paquin, A. M.: Epoxydverbindungen und Epoxyharze (1958), pp. 201–202.

NORMA S. MILESTONE, Primary Examiner